United States Patent
Ger et al.

(10) Patent No.: US 7,696,704 B2
(45) Date of Patent: Apr. 13, 2010

(54) DISCHARGE LAMP DRIVING DEVICE AND ELECTRONIC DEVICE USING THE SAME

(75) Inventors: Chih-Chan Ger, Taipei Hsien (TW); Chun-Ying Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 211 days.

(21) Appl. No.: 11/936,767

(22) Filed: Nov. 7, 2007

(65) Prior Publication Data

US 2008/0129221 A1 Jun. 5, 2008

(30) Foreign Application Priority Data

Dec. 1, 2006 (TW) ............................... 95221250 U

(51) Int. Cl.
*H05B 37/00* (2006.01)
(52) U.S. Cl. .................. 315/312; 315/161; 361/623; 361/679.01
(58) Field of Classification Search .................. 315/160, 315/161, 224–226, 246–247, 250, 255, 258, 315/276–277, 291, 312; 345/102; 361/601, 361/622, 623, 679.01, 826, 829
See application file for complete search history.

(56) References Cited

U.S. PATENT DOCUMENTS

| 6,949,890 | B2 * | 9/2005 | Chou et al. | ................ 315/294 |
|---|---|---|---|---|
| 7,221,108 | B2 * | 5/2007 | Gu et al. | ................ 315/312 |
| 7,436,133 | B2 * | 10/2008 | Chou et al. | ................ 315/324 |
| 7,479,745 | B2 * | 1/2009 | Chou et al. | ................ 315/324 |
| 7,518,317 | B2 * | 4/2009 | Chou et al. | ................ 315/276 |
| 7,535,161 | B2 * | 5/2009 | Suk | ................ 313/492 |
| 7,573,541 | B2 * | 8/2009 | Kim | ................ 349/59 |

FOREIGN PATENT DOCUMENTS

TW    M295780    8/2006

* cited by examiner

*Primary Examiner*—Thuy Vinh Tran
(74) *Attorney, Agent, or Firm*—Frank R. Niranjan

(57) ABSTRACT

A driving device for driving plural discharge lamps. A controller circuit converts a received signal to a first high voltage signal and a second high voltage signal. A first balancing circuit is mounted on a first connecting board and connected to one ends of the discharge lamps. A second balancing circuit is mounted on a second connecting board and connected to the other ends of the discharge lamps. A first set of high voltage lines connects the controller board and the first connecting board, and the first high voltage signal is outputted from the control circuit to the first balancing circuit via the first set of high voltage lines. A second set of high voltage lines connects the controller board and the second connecting board, and the second high voltage signal is outputted from the control circuit to the second balancing circuit via the second set of high voltage lines.

20 Claims, 7 Drawing Sheets

DISCHARGE LAMP DRIVING DEVICE AND ELECTRONIC DEVICE USING THE SAME

BACKGROUND OF THE INVENTION

1. Field of the Invention

The present invention generally relates to light source driving devices, and particularly to a light source driving device with a full-bridge circuit.

2. Description of Related Art

Liquid Crystal Display (LCD) panels generally use discharge lamps, especially Cold Cathode Fluorescent Lamps (CCFLs) as light sources of the backlight systems thereof. Typically, the CCFL is driven by an inverter that supplies AC signals. For larger LCD panels, long-type CCFLs are employed to achieve a desired brightness. In practical applications, the long-type CCFL should be driven by two high-voltage driving means to achieve even brightness.

FIG. 7a is a plane view of a currently existing electronic device 6, and FIG. 7b is a F-direction side view of FIG. 7a. The electronic device 6 comprises a LCD panel 610 and a two high-voltage discharge lamp driving devices. The two high-voltage discharge lamp driving devices are provided for driving a plurality of discharge lamps 64 disposed in the LCD panel 610 in parallel (as shown in FIG. 7b), which comprises a first control circuit board 61, a second control circuit board 61', a set of signal lines 612. The first control circuit board 61 is configured with a plurality of connectors 622, a first balancing circuit 62, and a first control circuit 63. The first balancing circuit 62 comprises a plurality of inductance element 621 respectively connected to one end of each of the discharge lamps 64. The second control circuit board 61' is configured with a plurality of connectors 622', a second balancing circuit 62', and a second control circuit 63'. The second balancing circuit 62' comprises a plurality of inductance elements 621' respectively connected to another end of each of the discharge lamps 64.

The first control circuit 63 is disposed on the first control circuit board 61, and is used for converting a received electrical signal to a first electrical signal that can drive the discharge lamps 64. The first balancing circuit 62 is also disposed on the first control circuit board 61, and is connected to the first control circuit 63 for balancing currents flowing through the discharge lamps 64. The first control circuit board 61 is connected to the discharge lamps 64 by way of the connectors 622. The second control circuit 63' is disposed on the second control circuit board 61', and is used for converting a received electrical signal to a second electrical signal that can drive the discharge lamps 64.

The second balancing circuit 62' is also disposed on the second control circuit board 61', and is connected to the second control circuit 63' for balancing currents flowing through the discharge lamps 64. The second control circuit board 61' is connected to the discharge lamps 64 by way of the connectors 622'. The first control circuit board 61 is connected to the second control circuit board 61' by way of the signal lines 612, and transmits a synchronization signal for the first control circuit 63 of the first control circuit board 61 to the second control circuit 63' of the second control circuit board 61'.

The two high-voltage discharge lamp driving devices convert the received signal (about 24V) to an AC signal that can drive the discharge lamps, which is defined as a low voltage driving means.

Another currently existing two high-voltage discharge lamp driving devices not only comprise the elements of the electronic device 6 of FIG. 7a, but comprise a first power factor correction circuit (Power Factor Correction, PFC) and a second PFC circuit. Each of the PFC circuits directly receives a local AC signal, such as 220V in Mainland China, and 110V in North America, and converts the AC signal to a DC signal of about 400V by use of the PFC circuits, and transmits the DC signal to an inverter circuit to light the discharge lamps. In contrast to the low voltage driving means, the driving means is defined as a high voltage driving means. The high voltage driving means has high efficiency due to omitting the circuit for converting a 400V signal to a 24V signal.

With said two driving means, the discharge lamp driving devices drive the discharge lamps 64, both by using the high voltage signals generated by the first control circuit 63 of the first control circuit board 61 and the second control circuit 63' of the second control circuit board 61'. However, both of the two driving means ineluctably increase the size of the LCD panel 610.

SUMMARY OF THE INVENTION

One aspect of the present invention provides a discharge lamp driving device for driving a plurality of discharge lamps. The discharge lamp driving device comprises: a control circuit board, configured with a control circuit, for converting a received power signal to a first high voltage signal and a second high voltage signal for driving the discharge lamps; a first connecting board, configured with a first balancing circuit connecting with one end of each of the discharge lamps, for balancing currents flowing through the discharge lamps; a second connecting board, configured with a second balancing circuit connecting with another end of each of the discharge lamps, for balancing currents flowing through the discharge lamps; a first set of high-voltage transmission line, connecting the control circuit board to the first connecting board, wherein the control circuit transmits the first high voltage signal to the first balancing circuit by way of the first set of high-voltage transmission line; and a second set of high-voltage transmission line, connecting the control circuit board to the second connecting board, wherein the control circuit transmits the second high voltage signal to the second balancing circuit by way of the second set of high-voltage transmission line.

Other advantages and novel features will become more apparent from the following detailed description when taken in conjunction with the accompanying drawings, in which:

BRIEF DESCRIPTION OF THE DRAWINGS

FIG. 1b is an A-direction view of the electronic device 1 of FIG. 1a;

FIG. 2b is a B-direction view of the electronic device of FIG. 2a;

FIG. 3b is a C-direction view of the electronic device 3 of FIG. 3a;

FIG. 4b is a D-direction view of the electronic device of FIG. 4a;

FIG. 5b is an E-direction view of FIG. 5a;

FIG. 6a is a schematic diagram of the control circuit of FIG. 1a; and

FIG. 6b is a schematic diagram of the control circuit of FIG. 2a;

FIG. 7b is a F-direction side view of FIG. 7a.

DETAILED DESCRIPTION OF THE EMBODIMENTS

Figure 1A:
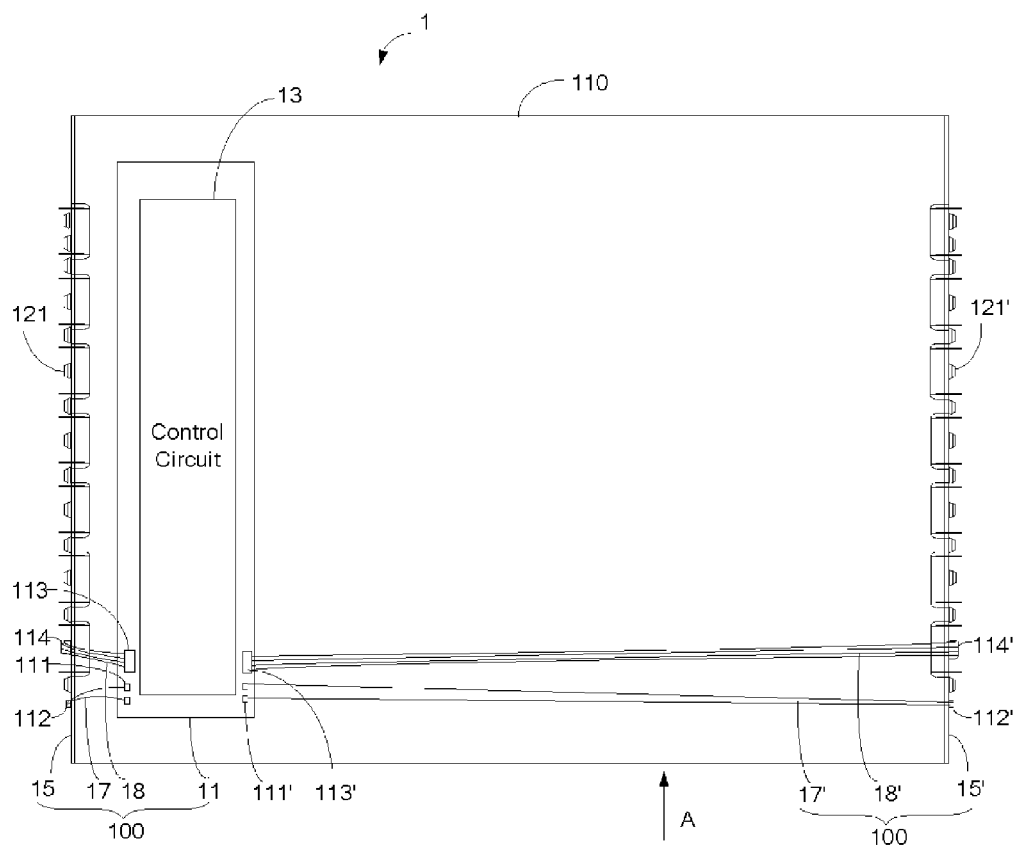
FIG. 1a is a plane view of an electronic device in accordance with a first embodiment of the present invention.
Figure 1B:
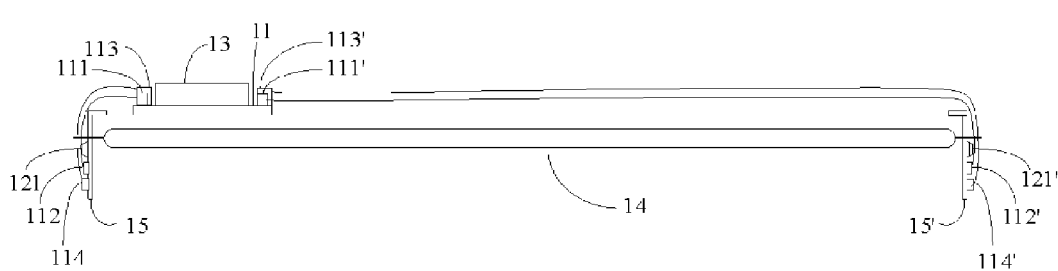

FIG. 1a is a plane view of an electronic device 1 for display in accordance with a first embodiment of the present invention. FIG. 1b is an A-direction view of the electronic device 1 of FIG. 1a. The electronic device 1 comprises a panel 110 for display and a discharge lamp driving device 100. The discharge lamp driving device 100 is used for driving a plurality of discharge lamps 14 disposed in parallel on the panel 110 (as shown in FIG. 1b), and comprises a control circuit board 11, a first connecting board 15, a second connecting board 15', a first set of high-voltage transmission lines 17, a second set of high-voltage transmission lines 17', a first set of protection lines 18, and a second set of protection lines 18'.

The control circuit board 11 is configured with a first connector 111, a third connector 113, a fifth connector 111', a seventh connector 113', and a control circuit 13. The first connecting board 15 is configured with a second connector 112, a fourth connector 114, a first balancing circuit (not labeled), and a first protection circuit (not shown). The first balancing circuit comprises a plurality of inductance elements 121 each respectively connected to one end of each of the discharge lamps 14. The second connecting board 15' is configured with a sixth connector 112', an eighth connector 114', a second balancing circuit (not labeled), and a second protection circuit (not shown). The second balancing circuit comprises a plurality of inductance elements 121' each respectively connected to another end of each of the discharge lamps 14. In this embodiment, the panel 110 is an LCD panel.

The control circuit 13 is disposed on the control circuit board 11, for converting a received signal to a first high voltage signal and a second high voltage signal that can drive the discharge lamps 14. The first balancing circuit is disposed on the first connecting board 15, for balancing currents flowing through the discharge lamps 14. The first set of high-voltage transmission lines 17, connect the control circuit board 11 to the first connecting board 15. In detail, the first connector 111 is disposed on the control circuit board 11, the second connector 112 is disposed on the first connecting board 15, the first set of high-voltage transmission lines 17 electrically connect the first connector 111 to the second connector 112. In this way, the first high voltage signal can be transmitted from the control circuit board 11 to the first connecting board 15 by way of the first set of high-voltage transmission lines 17.

The second balancing circuit is disposed on the second connecting board 15', also for balancing the currents flowing through the discharge lamps 14. The second set of high-voltage transmission lines 17' electrically connect the control circuit board 11 to the second connecting board 15'. In detail, the fifth connector 111' is disposed on the control circuit board 13, the sixth connector 112' is disposed on the second connecting board 15', the fifth connector 111' is electrically connected to the sixth connector 112' by way of the second set of high-voltage transmission lines 17'. In this way, the second high voltage signal can be transmitted from the control circuit board 11 to the second connecting board 15'.

In this embodiment, the first high voltage signal and the second high voltage signal are synchronized and with reverse phases. A high voltage and a low voltage end of the discharge lamps 14 respectively receive high voltage signals in reverse phase, that is, if the high voltage end of the discharge lamps 14 receives a positive phase high voltage signal, the low voltage end thereof receives a negative phase high voltage signal. In this embodiment, the phases of the signals received by high voltage ends of two neighboring discharge lamps 14 can be either same or reverse.

In this embodiment, the first set of high-voltage transmission lines 17 and the second set of high-voltage transmission lines 17' each comprises a high logic level high-voltage line and a low logic level high-voltage line.

In other embodiments, the first set of high-voltage transmission lines 17 and the second set of high-voltage transmission lines 17' are connected to the control circuit board 11, the first connecting board 15, and the second connecting board 15' by soldering other than via connectors 111, 112, 111', and 112'. The control circuit 13 transmits the first high voltage signal and the second high voltage signal to the first balancing circuit and the second balancing circuit respectively by way of the first set of high-voltage transmission lines 17 and the second set of high-voltage transmission lines 17'. In soldering, the first connector 111, the second connector 112, the fifth connector 111' and the sixth connector 112' can be omitted.

The first protection circuit is disposed on the first connecting board 15, and outputs a first protection signal to the control circuit 13 for controlling the output of the control circuit 13. The third connector 113 is disposed on the control circuit board 11, the fourth connector 114 is disposed on the first connecting board 15, the third connector 113 is connected to the fourth connector 114 via the first set of protection lines 18. In this way, the first set of protection lines 18 electrically connects the control circuit board 11 to the first connecting board 15. The second protection circuit is disposed on the second connecting board 15', and outputs a second protection signal to the control circuit 13, for controlling the output of the control circuit 13. The seventh connector 113' is disposed on the control circuit board 11, the eighth connector 114' is disposed on the second connecting board 15', the second set of protection lines 18' electrically connects the seventh connector 113' to the eighth connector 114', consequently electrically connecting the control circuit board 11 to the second connecting board 15'.

When one or more of the discharge lamps 14 operates malfunctions, such as developing a short or open, the protection circuits can output the first protection signal or the second protection signal to the control circuit 13 by way of the first set of protection lines 18 or the second set of protection lines 18', for protecting the discharge lamp driving device 100.

In other embodiments, the first set of protection lines 18 and the second set of protection lines 18' may be connected to the control circuit board 11, the first connecting board 15, and the second connecting board 15' by soldering other than via the third connector 113, the fourth connector 114', the seventh connector 113', and the eighth connector 114'.

In the example embodiment, the discharge lamp driving device 100 is driven by a low voltage driving means. Because the discharge lamp driving device 100 just employs one control circuit 13 to control two balancing circuits, the first protection circuit and the second protection circuit are moved from the control circuit board 11, and are respectively disposed on the first connecting board 15 and the second connecting board 15'. Furthermore, the first connecting board 15 and the second connecting board 15' are disposed on two sides of the panel 110, and are substantially vertical to the control circuit board 11, which lowers the cost and the size of the discharge lamp driving device 100 on the panel 110, and reserves more design space on the panel 110 for downstream plants, such as LCD TV manufacturers.

In addition, the discharge lamp driving device 100 employs less connectors, to connect the first set of high-voltage transmission lines 17 and the second set of high-voltage transmission lines 17' to the control circuit board 11, the first connecting board 15, and the second connecting board 15'. In this way, panel manufacturers only need to connect the first connecting board 15 and the second connecting board 15' to the panel 110, but not onto the control circuit board 11, which can reduce cost to the panel manufacturers, and increase manufacturing flexibility.

In other embodiment, the high voltage ends of the discharge lamps 14 can be directly soldered to the first connecting board 15, and the low voltage ends thereof can be directly soldered to the second connecting board 15', which lowers the manufacture cost of the panel 110, and is convenient for assembly.

Figure 2A:
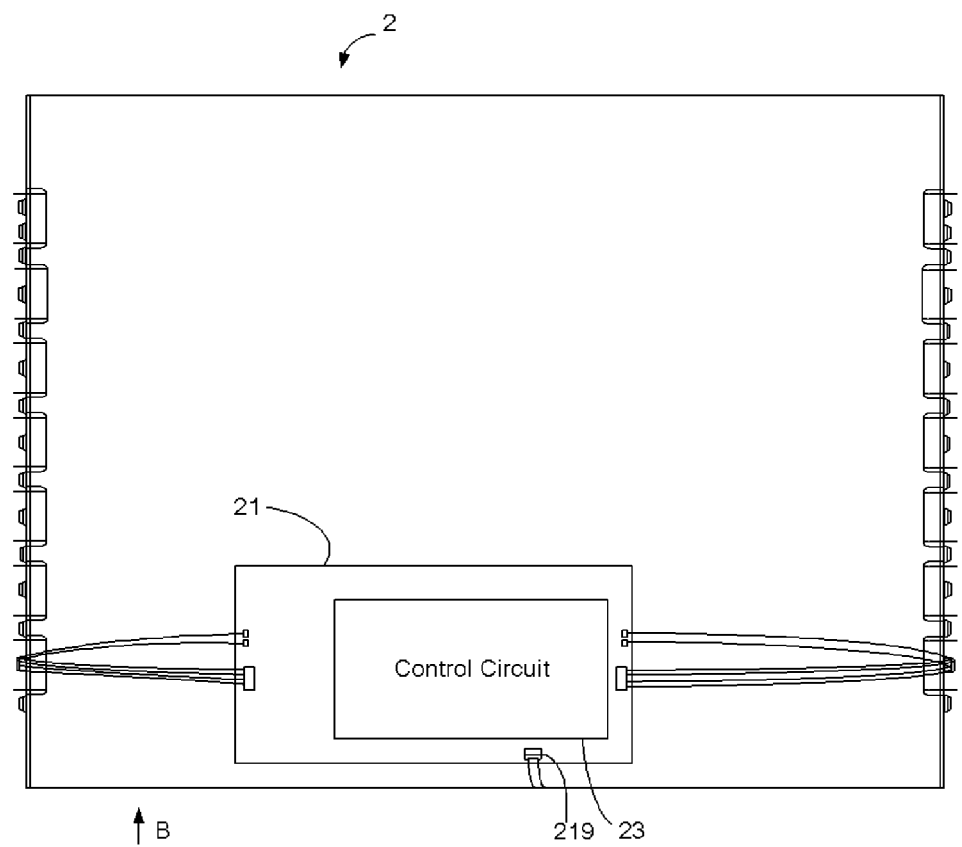
FIG. 2a is a planar view of an electronic device in accordance with a second embodiment of the present invention.
Figure 2B:
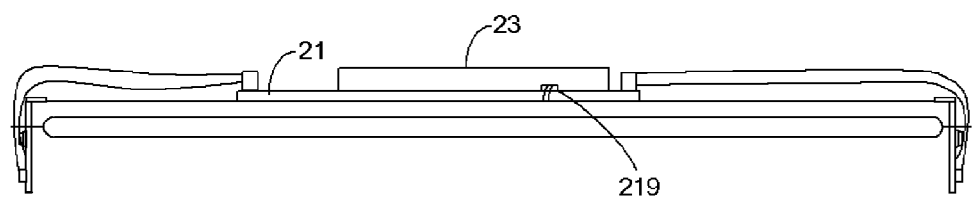

FIG. 2a is a planar view of an electronic device 2 in accordance with another embodiment of the present invention. FIG. 2b is a B-direction view of the electronic device 2 of FIG. 2a. The structure of the electronic device 2 is similar to that of the electronic device 1 of FIG. 1a. The difference is that a control circuit board 21 configured with a control circuit 23 thereon further comprises a ninth connector 219 through which the electronic device 2 can be directly connected to a local AC signal, such as 220V in Mainland China, and 110V in North America.

Figure 3A:
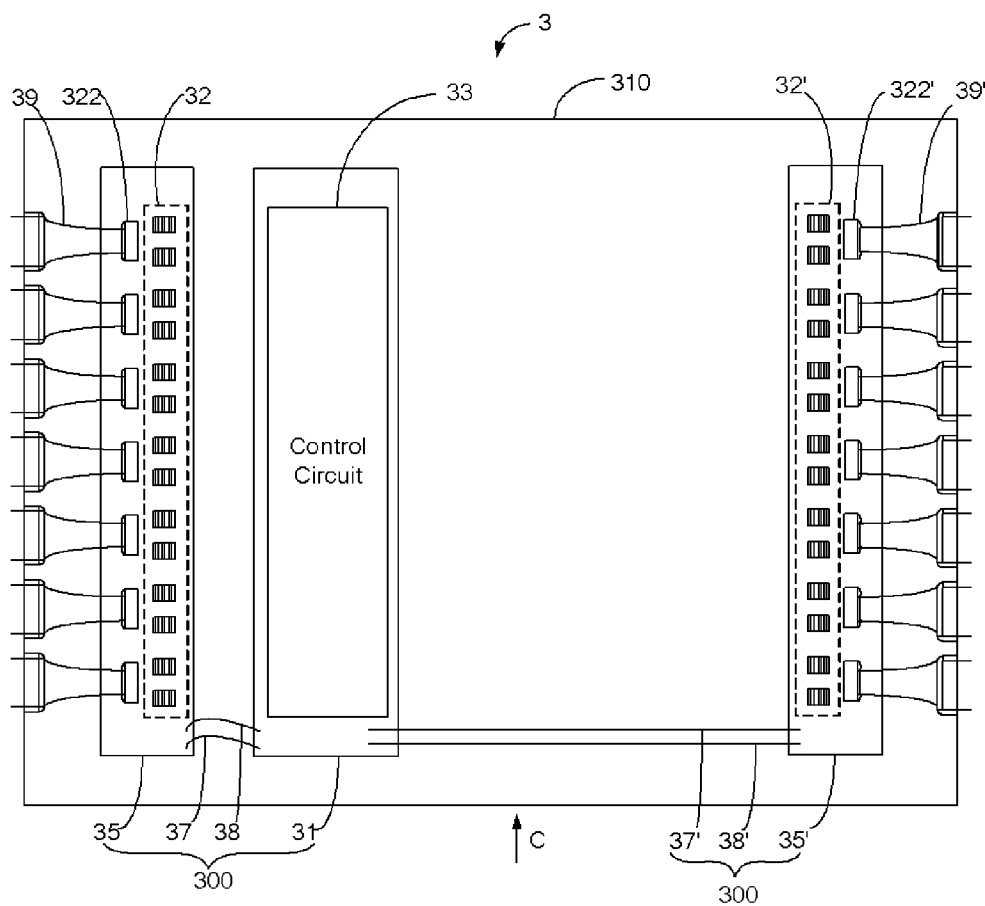
FIG. 3a is a planar view of an electronic device in accordance with a third embodiment of the present invention.
Figure 3B:
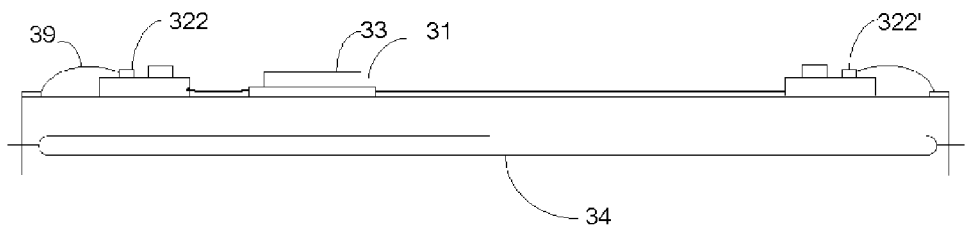

FIG. 3a is a planar view of an electronic device 3 in accordance with another embodiment of the present invention. FIG. 3b is a C-direction view of the electronic device 3 of FIG. 3a. The structure of the electronic device 3 is similar to that of the electronic device 1 of FIG. 1a. In this embodiment, a first connecting board 35, a second connecting board 35', and a control circuit board 31 of a discharge lamp driving device 300 of the electronic device 3 are on a same surface, and the first connecting board 35 and the control circuit board 31 are close to each other.

A first set of high-voltage transmission lines 37 and a first set of protection lines 38 connect the control circuit board 31 to the first connecting board 35 by soldering. The first connecting board 35 further comprises a plurality of connectors 322 through which the first connecting board 35 is electrically connected to one end of each of a plurality of discharge lamps 34. In this embodiment, the high voltage end of each discharge lamp 34 is connected to one of the connectors 322 via a connecting line 39. In addition, a second high voltage line 37' and a second protection line 38' connect the control circuit board 31 to the second connecting board 35' by means of soldering. The second connecting board 35' also comprises a plurality of connectors 322' through which the second connecting board 35' is connected to another end of each of the plurality of discharge lamps 34. In this embodiment, the low voltage end of each discharge lamp 34 is connected to one of the connectors 322' via a connecting line 39'.

In this exemplary embodiment, the discharge lamp driving device 300 employs one control circuit 33 to control two control circuits 32, 32', the first connecting board 35 and the second connecting board 35' are 4-layer boards, which occupy less space on the panel 310 than that of prior art. As a result, the discharge lamp driving device 300 occupies a smaller area on the panel 310. In this embodiment, panel manufacturers just need to put the first connecting board 35 and the second connecting board 35' onto the panel 310, other than on the control circuit board 31.

In addition, finished product plants can connect the control circuit board 31 to the first connecting board 35 and the second connecting board 35' by way of the first high voltage line 37, the second high voltage line 37', the first protection line 38, and the second protection line 38'.

Figure 4A:
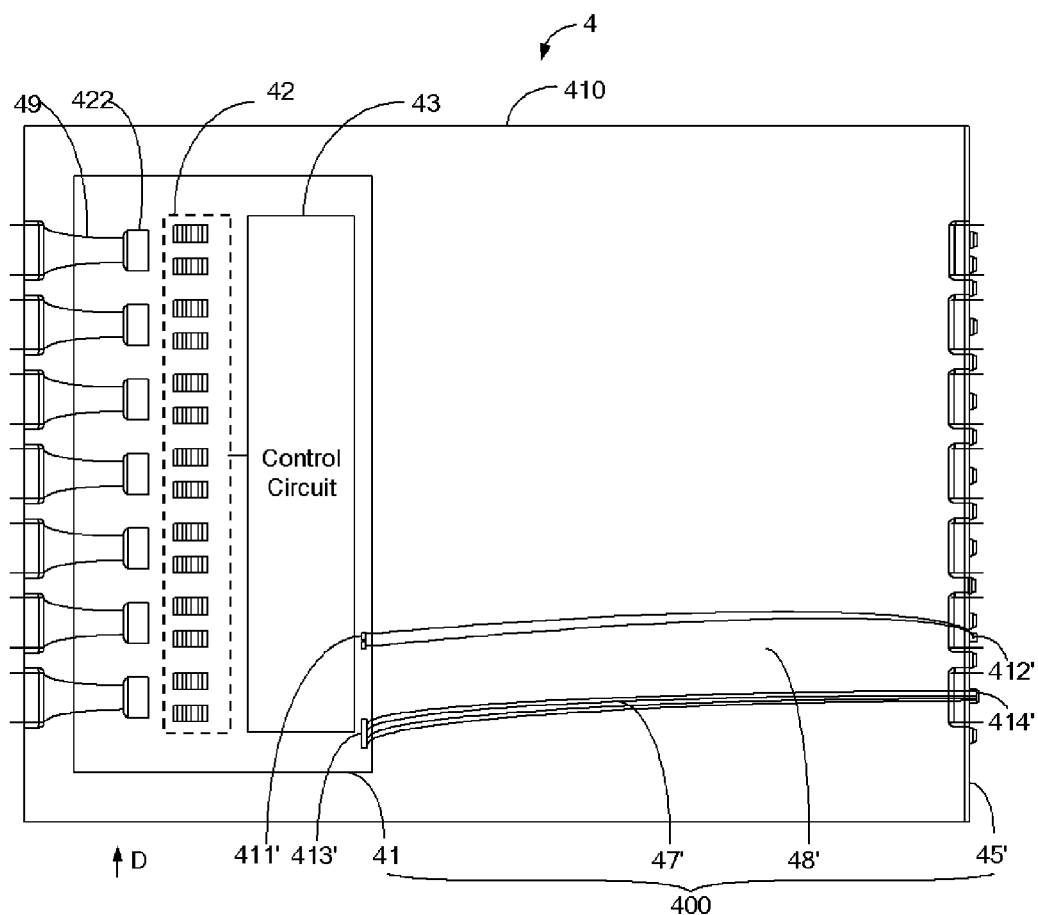
FIG. 4a is a plane view of an electronic device according to a fourth embodiment of the present invention.
Figure 4B:
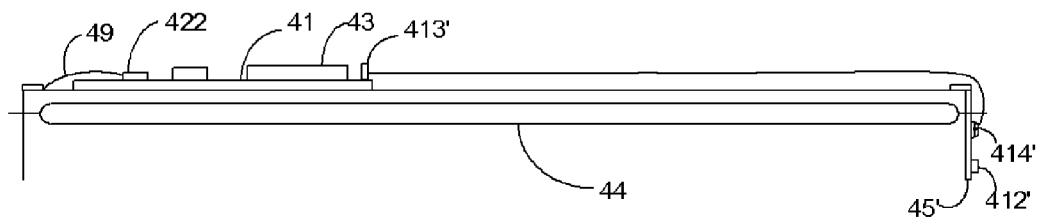

FIG. 4a is a plane view of an electronic device 4 according to a fourth embodiment of the present invention. FIG. 4b is a D-direction view of the electronic device 4 of FIG. 4a. The electronic device 4 is similar to the electronic device 1 of FIG. 1a, the difference is that a first balancing circuit 42 of a discharge lamp driving device 400 and a control circuit 43 of the electronic device 4 are both disposed on a control circuit board 41. The control circuit board 41 comprises a plurality of connectors 422. One end of the balancing circuit 42 is connected to the control circuit 43 for receiving the first high voltage signal, another end thereof is connected to one end of each of the discharge lamps 44 respectively by way of the plurality of connectors 422, for balancing the currents flowing through the discharge lamps 44. In this embodiment, one end of each discharge lamp 44 is connected to one connector 422 via a connecting line 49, another end thereof is connected to a second balancing circuit (not shown) on a connecting board 45'. The control circuit board 41 is also connected to the connecting board 45' by way of a connector 411', protection lines 48', a connector 412', and a connector 413', high voltage transmission lines 47' and a connector 414'.

In this embodiment, the discharge lamp driving device 400 just employs one control circuit 43 to control two balancing circuits, and the second balancing circuit is disposed on the connecting board 45' that is not disposed on the panel 410, but is substantially vertical to the control circuit board 41, which lowers manufacturing cost and also reserves more space on the panel 410 for downstream plants.

Figure 5A:
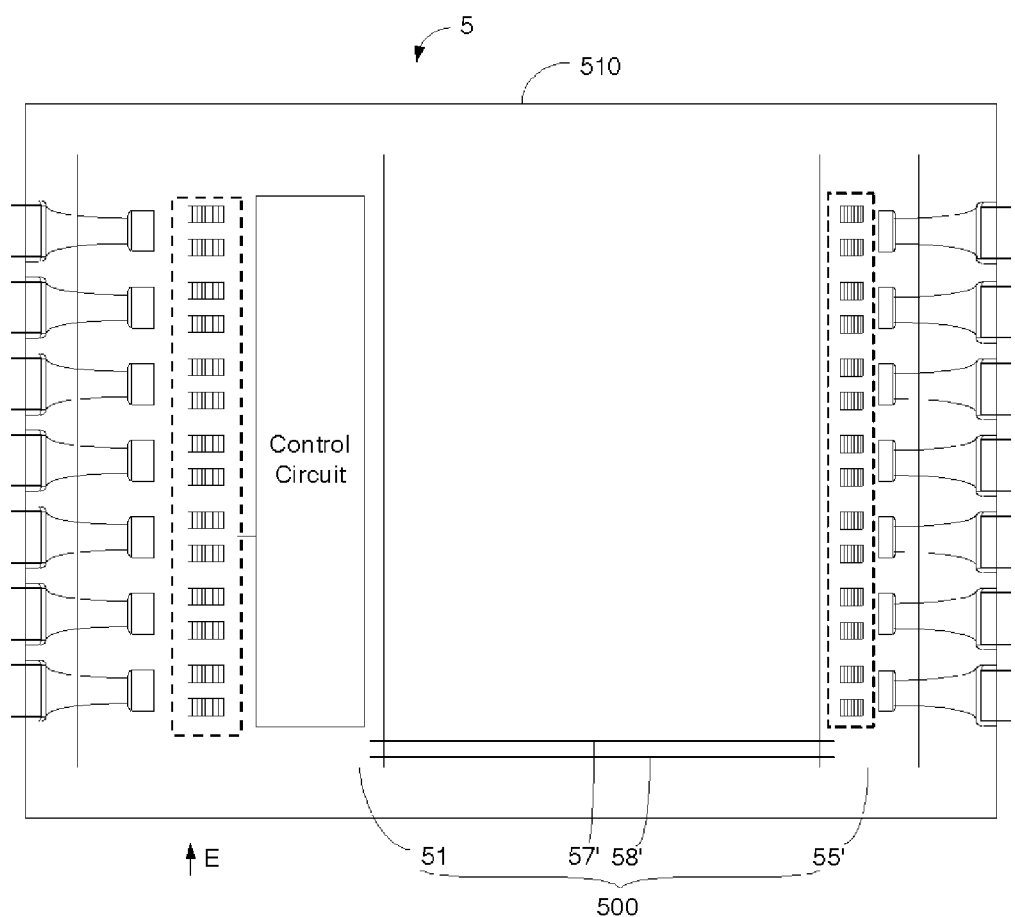
FIG. 5a is a plane view of an electronic device according to a fifth embodiment of the present invention.
Figure 5B:
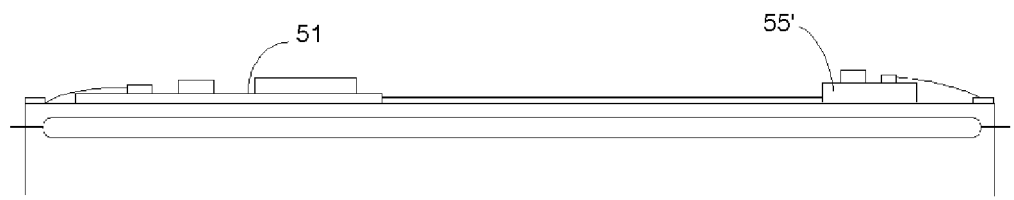

FIG. 5a is a plane view of an electronic device 5 according to a fifth embodiment of the present invention, and FIG. 5b is an E-direction view of the electronic device 5 of FIG. 5a. The electronic device 5 is similar to the electronic device 4 of FIG. 4a, the difference is that a connecting board 55' and a control circuit board 51 of a discharge lamp driving device 500 in the electronic device 5 are disposed on a panel 510, and the control circuit board 51 is connected to the connecting board 55' by way of a high voltage line 57' and a protection line 58', by soldering.

In this embodiment, the discharge lamp driving device 500 employs one control circuit 53 to control two balancing circuits 52, 52', and the connecting board 55 is a 4-layer board, which can reserve more space on the panel 510.

Figure 6A:
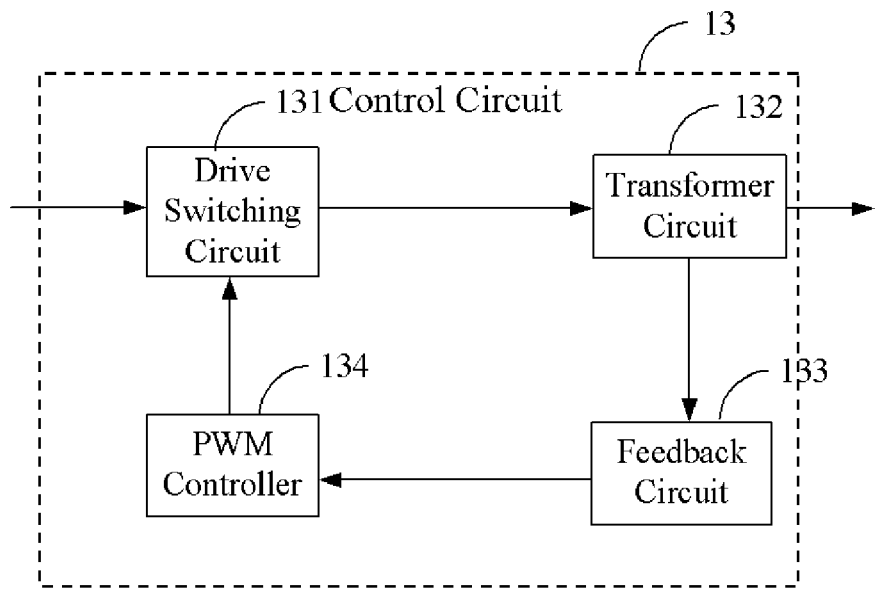

FIG. 6a is a schematic diagram of the control circuit 13 in FIG. 1a. The control circuit 13 comprises a drive switching circuit 131, a transformer circuit 132, a feedback circuit 133, and a pulse width modulation (PWM) controller 134. The drive switching circuit 131 is used for converting a received electrical signal to an AC signal. The transformer circuit 132 is connected to the drive switching circuit 131, and is used for transforming the AC signal to a first high voltage signal and a second high voltage signal, which can drive the discharge lamps 14. In this embodiment, the received electrical signal is a DC signal (about 24V), the AC signal is a square wave signal, the first high voltage signal and the second high voltage signal are sine-wave signals, and the phases of the first high voltage signal and the second high voltage signal are reverse. The feedback circuit 133 is disposed between the transformer circuit 132 and the PWM controller 134, and is used for feeding the current flowing through the discharge lamps 14 to the PWM controller 134. The PWM controller 134 connects to the drive switching circuit 131, for controlling the output of the drive switching circuit 131. In this embodiment, the transformer circuit 132 comprises at least one transformer (not shown).

Figure 6B:
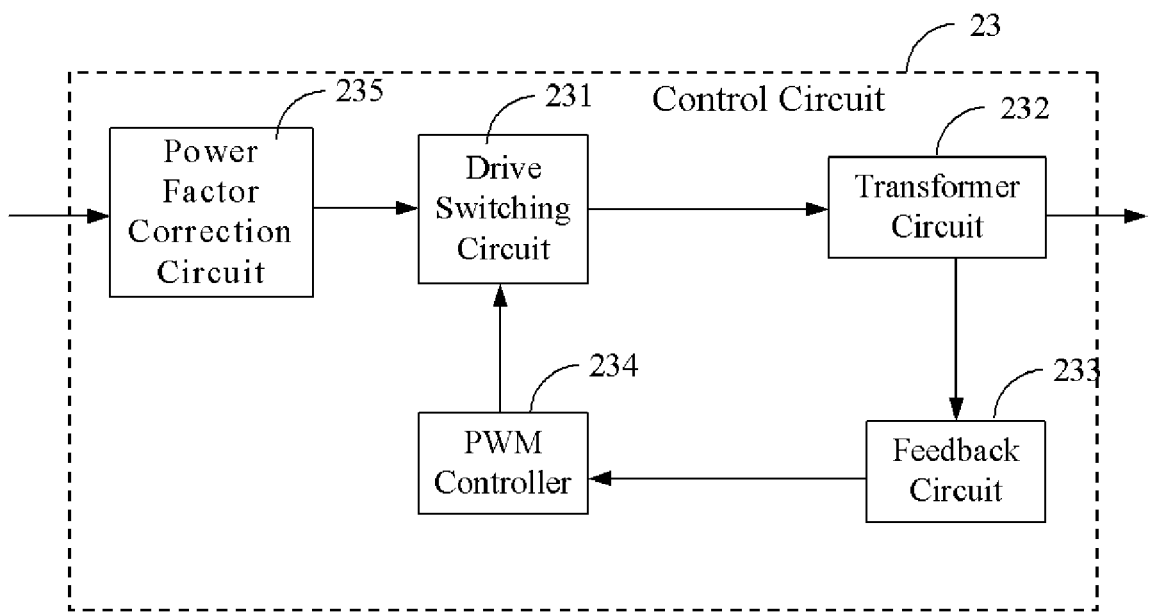
Figure 7A:
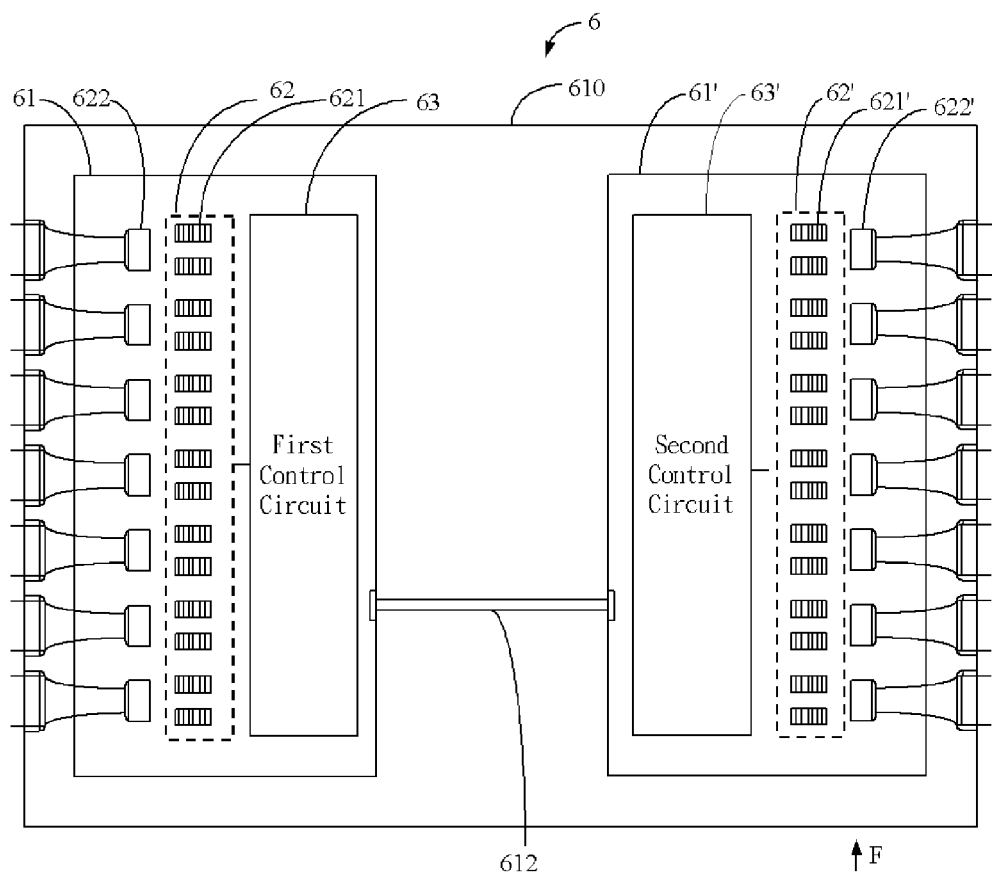
FIG. 7a is a plane view of a prior electronic device.
Figure 7B:
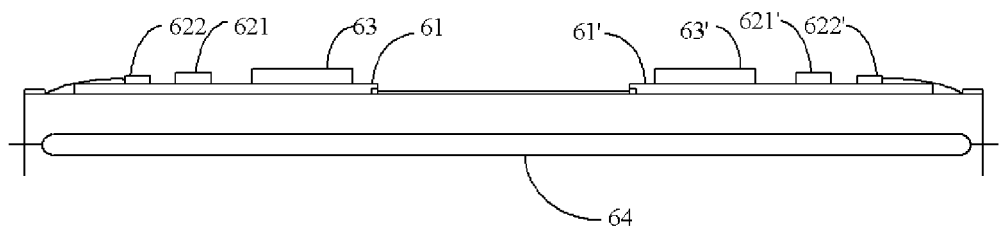

FIG. 6b is a schematic diagram of the control circuit 23 of FIG. 2a. The control circuit 23 is similar to the control circuit 13 of FIG. 6a, a difference is that the control circuit 23 further comprises a power factor correction circuit 235 connected to the drive switching circuit 231, for converting the received signal to a DC signal, and correcting the power factor of the control circuit 23. In this embodiment, the received signal is a local AC signal.

Said discharge lamp driving devices in accordance with plural exemplar embodiments each just employs one control circuit to controlling two balancing circuits, and the balancing circuits and the control circuit are respectively disposed on different circuit boards, which reduces the volume of the discharge lamp driving device.

While various embodiments and methods of the present invention have been described above, it should be understood that they have been presented by way of example only and not by way of limitation. Thus, the breadth and scope of the present invention should not be limited by the above-described exemplary embodiments, but should be defined only in accordance with the following claims and their equivalents.

What is claimed is:

1. A discharge lamp driving device for driving a plurality of discharge lamps, comprising:
    a control circuit board, configured with a control circuit, for converting a received power signal to a first high voltage signal and a second high voltage signal for driving the discharge lamps;
    a first connecting board, configured with a first balancing circuit connecting with one end of each of the discharge lamps, for balancing currents flowing through the discharge lamps;
    a second connecting board, configured with a second balancing circuit connecting with another end of each of the discharge lamps, for balancing currents flowing through the discharge lamps;
    a first set of high-voltage transmission lines, connecting the control circuit board to the first connecting board, wherein the control circuit transmits the first high voltage signal to the first balancing circuit by way of the first set of high-voltage transmission lines; and
    a second set of high-voltage transmission lines, connecting the control circuit board to the second connecting board, wherein the control circuit transmits the second high voltage signal to the second balancing circuit by way of the second set of high-voltage transmission lines.

2. The discharge lamp driving device as recited in claim 1, wherein phases of the first high voltage signal and the second high voltage signal are reverse.

3. The discharge lamp driving device as recited in claim 1, wherein the first connecting board and the second connecting board are both substantially vertical to the control circuit board.

4. The discharge lamp driving device as recited in claim 1, wherein the first connecting board and the second connecting board are both parallel to the control circuit board.

5. The discharge lamp driving device as recited in claim 1, wherein the first connecting board and the second connecting board are 4-layer board.

6. The discharge lamp driving device as recited in claim 1, wherein the first balancing circuit and the second balancing circuit each comprises a plurality of inductance elements electrically connected to the discharge lamps.

7. The discharge lamp driving device as recited in claim 1, further comprising a first protection circuit disposed on the first connecting board, for outputting a first protection signal to the control circuit to control the output of the control circuit.

8. The discharge lamp driving device as recited in claim 7, further comprising a first set of protection lines connecting the control circuit board to the first connecting board, wherein the first protection circuit output the first protection signal to the control circuit by way of the first set of protection lines.

9. The discharge lamp driving device as recited in claim 8, further comprising a second protection circuit disposed on the second connecting board, for outputting a second protection signal to the control circuit to control the output of the control circuit.

10. The discharge lamp driving device as recited in claim 9, further comprising a second set of protection lines connected to the control circuit board and the second connecting board, wherein the second protection circuit outputs the second protection signal to the control circuit by way of the second set of protection lines.

11. The discharge lamp driving device as recited in claim 1, wherein the control circuit comprises:
    a drive switching circuit, for converting the received signal to an AC signal;
    a transformer circuit, connected to the drive switching circuit, for transforming the AC signal to the first high voltage signal and the second high voltage signal which can drive the discharge lamps; and
    a PWM controller, connected to the drive switching circuit, for controlling the output of the drive switching circuit.

12. The discharge lamp driving device as recited in claim 11, wherein the control circuit further comprises a feedback circuit disposed between the transformer circuit and the PWM controller, for feeding the currents flowing through the discharge lamps to the PWM controller.

13. The discharge lamp driving device as recited in claim 11, wherein the control circuit further comprises a power factor correction circuit connected to the drive switching circuit, for converting the received signal to a DC signal, and correcting the power factor of the control circuit.

14. An electronic device, comprising:
    a panel; and
    a discharge lamp driving device, for driving a plurality of discharge lamps disposed on the panel in parallel, the discharge lamp driving device comprising:
    a control circuit board, configured with a control circuit, for converting a received power signal to a first high voltage signal and a second high voltage signal for driving the discharge lamps;
    a first connecting board, configured with a first balancing circuit connecting with one end of each of the discharge lamps, for balancing currents flowing through the discharge lamps;
    a second connecting board, configured with a second balancing circuit connecting with another end of each of the discharge lamps, for balancing currents flowing through the discharge lamps;
    a first set of high-voltage transmission lines, connecting the control circuit board to the first connecting board, wherein the control circuit transmits the first high voltage signal to the first balancing circuit by way of the first set of high-voltage transmission lines; and
    a second set of high-voltage transmission lines, connecting the control circuit board to the second connecting board, wherein the control circuit transmits the second high voltage signal to the second balancing circuit by way of the second set of high-voltage transmission lines.

15. The electronic device as recited in claim 14, wherein phases of the first high voltage signal and the second high voltage signal are reverse.

16. The electronic device as recited in claim 14, wherein the first connecting board and the second connecting board are both substantially vertical to the control circuit board.

17. The electronic device as recited in claim 14, wherein the first connecting board and the second connecting board are both parallel to the control circuit board.

18. The electronic device as recited in claim 14, wherein the first connecting board and the second connecting board are 4-layer printed circuit boards.

19. The electronic device as recited in claim 14, further comprising a first protection circuit disposed on the first connecting board for outputting a first protection signal to the control circuit to control the output of the control circuit, and a second protection circuit disposed on the second connecting board for outputting a second protection signal to the control circuit to control the output of the control circuit.

20. An electronic device for display comprising:
a panel for display;
a plurality of discharge lamps disposed on said panel in parallel with each other; and
a discharge lamp driving device disposed on said panel for driving said plurality of discharge lamps, comprising a control circuit board configured with a control circuit to convert a received power signal to at least one high voltage signal for driving said plurality of discharge lamps, at least one connecting board physically separable from said control circuit board and configured with only a balancing circuit thereon to receive said at least one high voltage signal from said control circuit board for balancing electrical currents flowing through said plurality of discharge lamps, said at least one connecting board electrically connectable with at least one end of each of said plurality of discharge lamps, and electrically connectable with said control circuit board through a set of high-voltage transmission lines so that said control circuit transmits said at least one high voltage signal to said balancing circuit by way of said set of high-voltage transmission lines.

* * * * *